(12) United States Patent
Nelson

(10) Patent No.: US 10,687,629 B1
(45) Date of Patent: Jun. 23, 2020

(54) FLOATATION MATTRESS ASSEMBLY

(71) Applicant: Monty Nelson, Bald Knob, AR (US)

(72) Inventor: Monty Nelson, Bald Knob, AR (US)

(*) Notice: Subject to any disclaimer, the term of this patent is extended or adjusted under 35 U.S.C. 154(b) by 0 days.

(21) Appl. No.: 16/441,373

(22) Filed: Jun. 14, 2019

(51) Int. Cl.
- *B63B 21/29* (2006.01)
- *B63B 34/00* (2020.01)
- *A47C 15/00* (2006.01)
- *A47C 17/64* (2006.01)
- *B29C 43/02* (2006.01)

(52) U.S. Cl.
CPC ............ *A47C 15/006* (2013.01); *A47C 17/64* (2013.01); *B29C 43/021* (2013.01); *B63B 21/29* (2013.01); *B63B 34/00* (2020.02); *A63B 2225/605* (2013.01); *B29C 2043/023* (2013.01)

(58) Field of Classification Search
CPC ....... A47C 15/006; A47C 17/64; B63B 34/00; B63B 21/29
See application file for complete search history.

(56) References Cited

U.S. PATENT DOCUMENTS

| | | | | |
|---|---|---|---|---|
| 4,693,691 A * | 9/1987 | DeYoe | ...................... | B63C 9/30 |
| | | | | 441/129 |
| 4,986,781 A * | 1/1991 | Smith | ................... | A47C 15/006 |
| | | | | 4/541.3 |
| 5,186,667 A * | 2/1993 | Wang | ................... | A47C 15/006 |
| | | | | 441/129 |
| 5,779,513 A * | 7/1998 | Burton | ..................... | B63B 34/50 |
| | | | | 441/129 |
| 5,885,123 A * | 3/1999 | Clifford | ............... | A47C 15/006 |
| | | | | 441/129 |
| 6,209,150 B1 * | 4/2001 | Hsu | ....................... | E04H 4/0025 |
| | | | | 4/499 |
| 2006/0116039 A1 * | 6/2006 | Pole, III | .................. | B63B 34/00 |
| | | | | 441/129 |
| 2009/0163096 A1 * | 6/2009 | Mix | ........................ | A63B 69/12 |
| | | | | 441/129 |
| 2010/0323180 A1 * | 12/2010 | Chen | ................... | A47G 27/0212 |
| | | | | 428/221 |
| 2011/0159756 A1 * | 6/2011 | Shen | ...................... | B29C 43/021 |
| | | | | 441/129 |
| 2011/0183557 A1 * | 7/2011 | Edmonds | ................ | B63B 34/00 |
| | | | | 441/129 |
| 2014/0290022 A1 * | 10/2014 | Gratch | ................... | A47G 9/062 |
| | | | | 29/401.1 |

* cited by examiner

*Primary Examiner* — Lars A Olson
*Assistant Examiner* — Jovon E Hayes

(57) ABSTRACT

A floatation mattress assembly for sleeping upon or floating in a body of water includes a mat that is comprised of a resiliently compressible material for sleeping upon. The mat is comprised of a buoyant material to float on a body of water. The mat is structured to have the ornamental appearance of a flip flop article of footwear. A first tube is pivotally coupled to the mat, and the first tube is positionable in a deployed position or a stored position. A second tube is coupled to the first tube and slidably extends through the mat. Thus, the first and second tubes have the ornamental appearance of foot straps on the flip flop article of footwear. A net is removably attached to each of the first and second tubes. The net forms a hemispherical dome over the mat when the first tube is positioned in the deployed position.

12 Claims, 7 Drawing Sheets

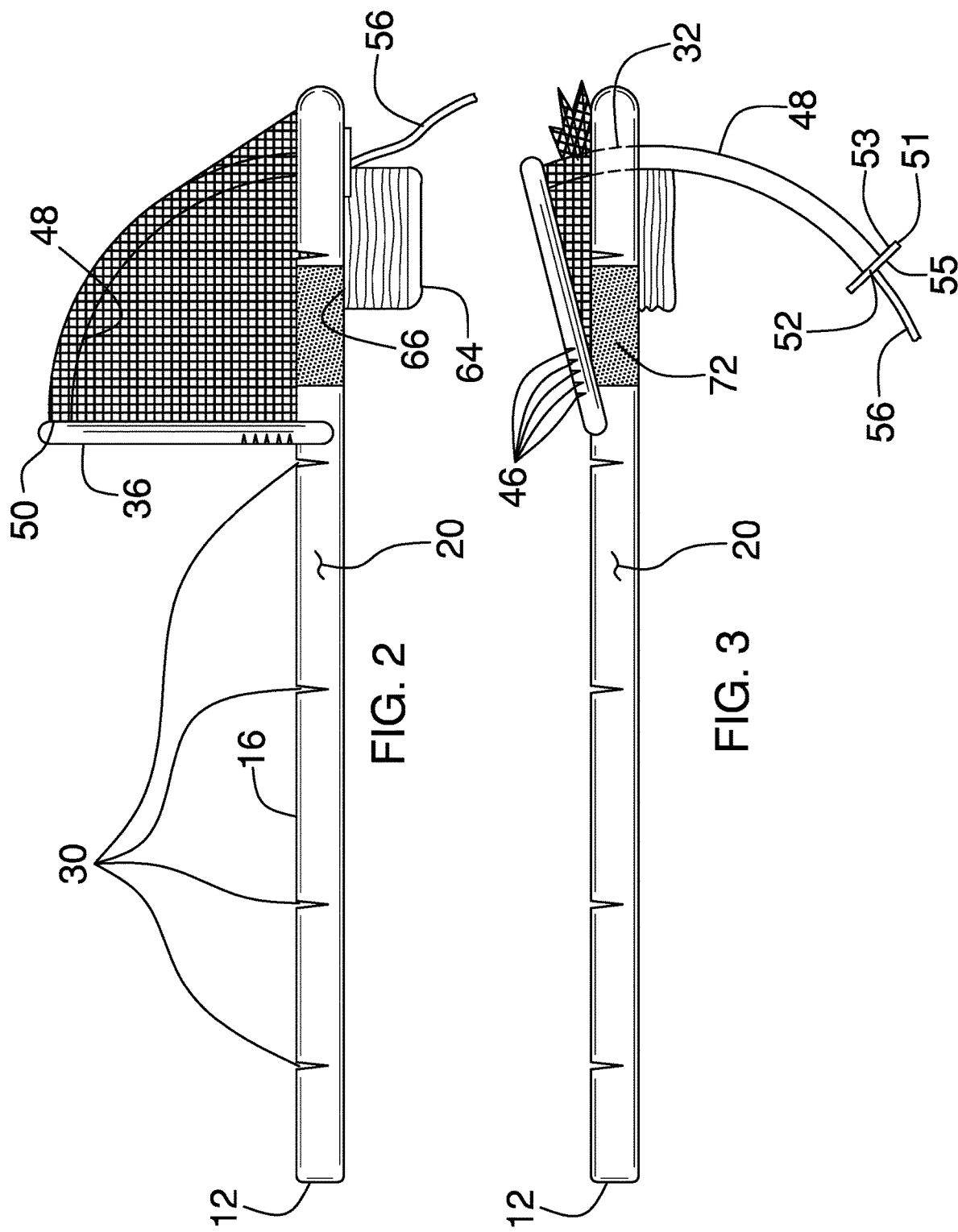

FLOATATION MATTRESS ASSEMBLY

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to mattress devices and more particularly pertains to a new mattress device for sleeping upon or for floating in a body of water.

BRIEF SUMMARY OF THE INVENTION

An embodiment of the disclosure meets the needs presented above by generally comprising a mat that is comprised of a resiliently compressible material for sleeping upon. The mat is comprised of a buoyant material to float on a body of water. The mat is structured to have the ornamental appearance of a flip flop article of footwear. A first tube is pivotally coupled to the mat, and the first tube is positionable in a deployed position or a stored position. A second tube is coupled to the first tube and slidably extends through the mat. Thus, the first and second tubes have the ornamental appearance of foot straps on the flip flop article of footwear. A net is removably attached to each of the first and second tubes. The net forms a hemispherical dome over the mat when the first tube is positioned in the deployed position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 2 is a right side view of an embodiment of the disclosure showing a first tube in a deployed position.

FIG. 3 is a right side view of an embodiment of the disclosure showing a first tube in a stored position.

DETAILED DESCRIPTION OF THE INVENTION

Figure 1:
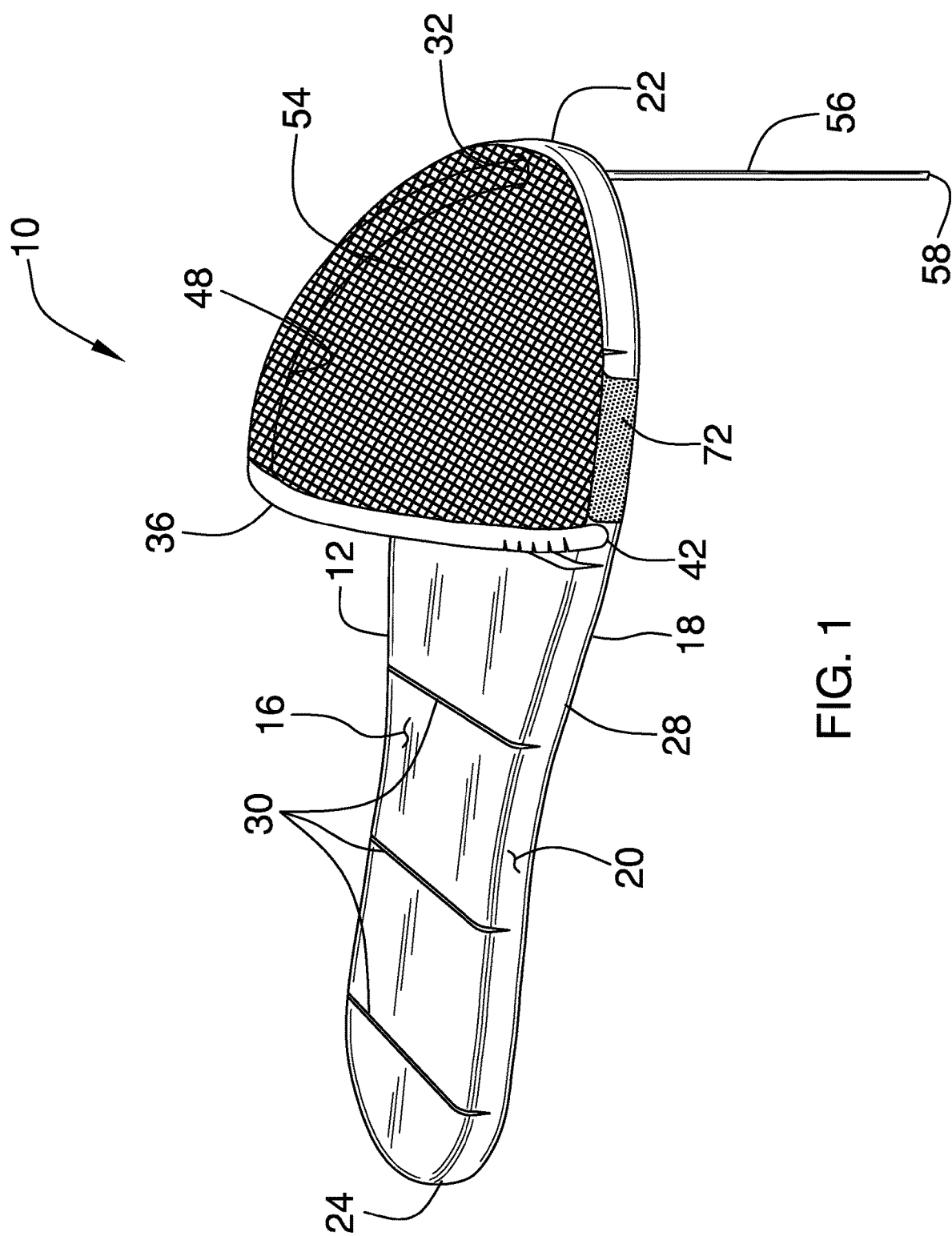
FIG. 1 is a perspective view of a floatation mattress assembly according to an embodiment of the disclosure.
Figure 4:
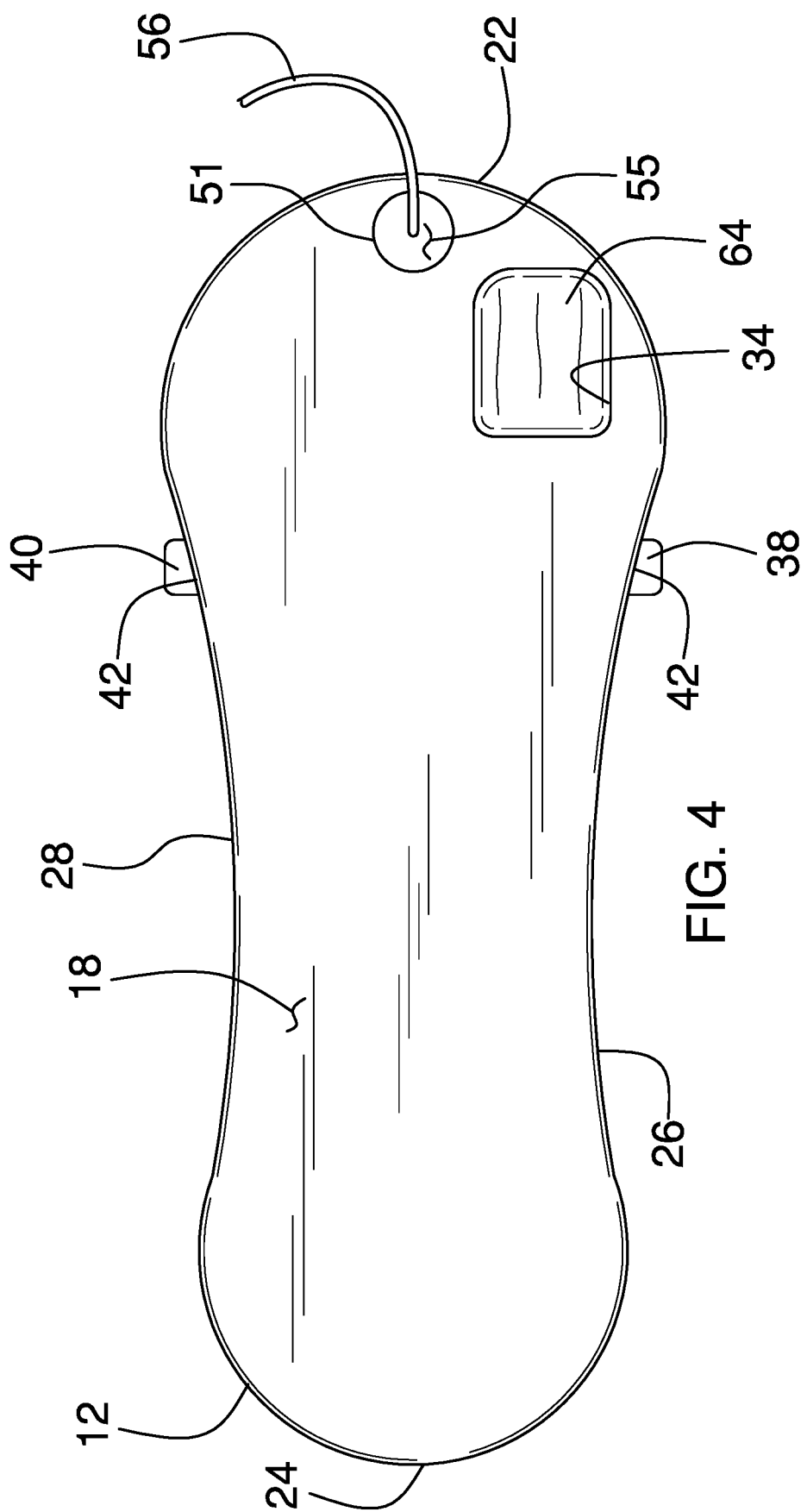
FIG. 4 is a bottom view of an embodiment of the disclosure.
Figure 5:
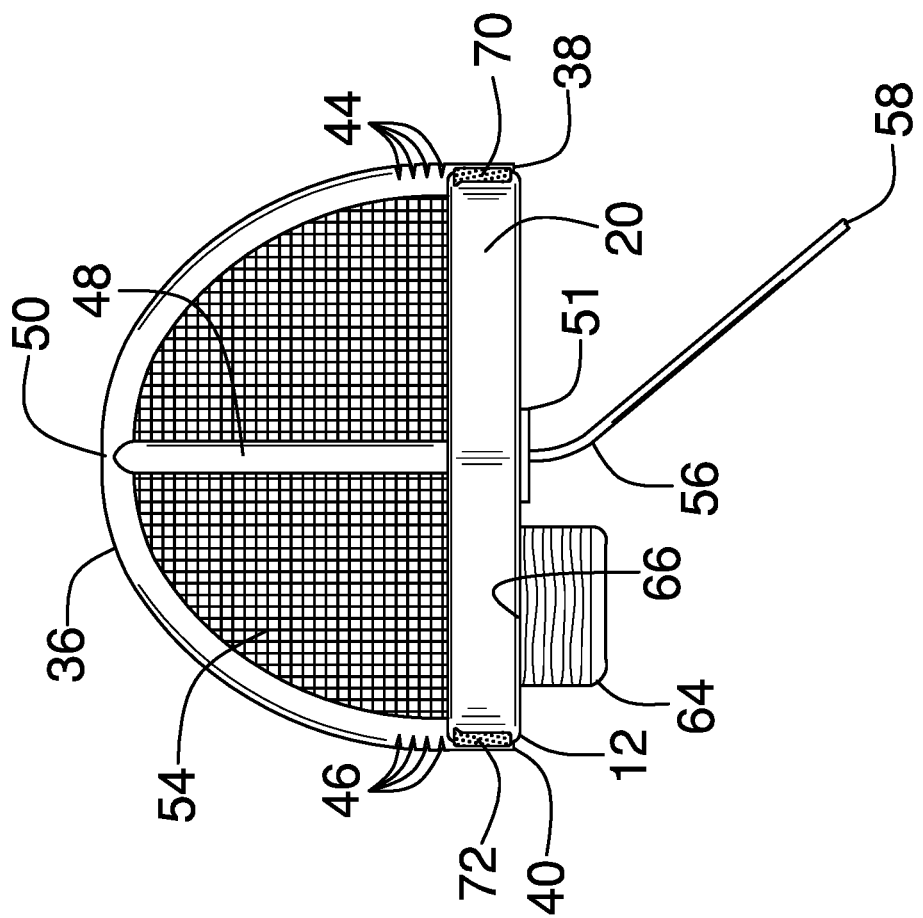
FIG. 5 is a front view of an embodiment of the disclosure.
Figure 6:
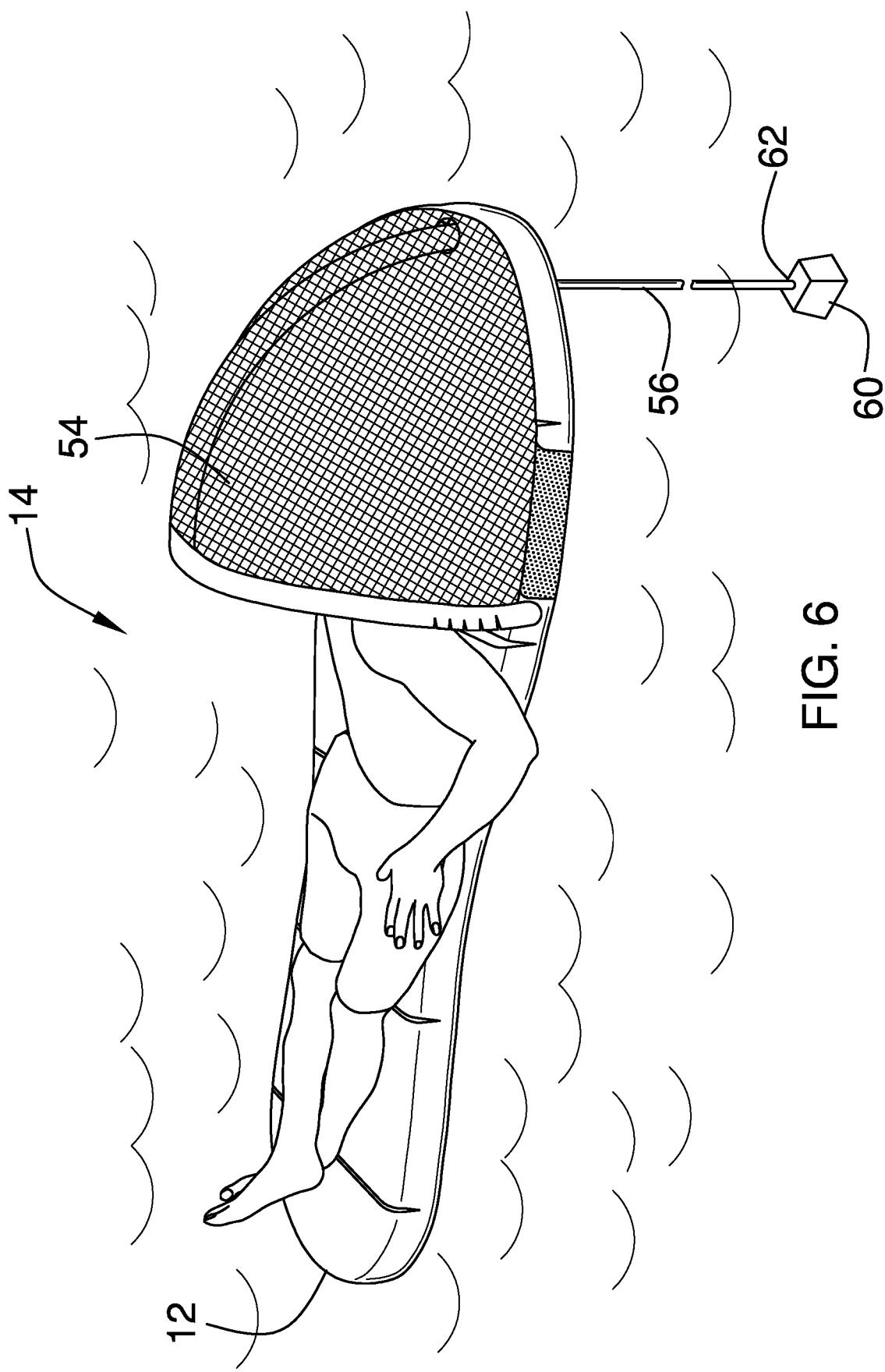
FIG. 6 is a perspective in-use view of an embodiment of the disclosure.
Figure 7:
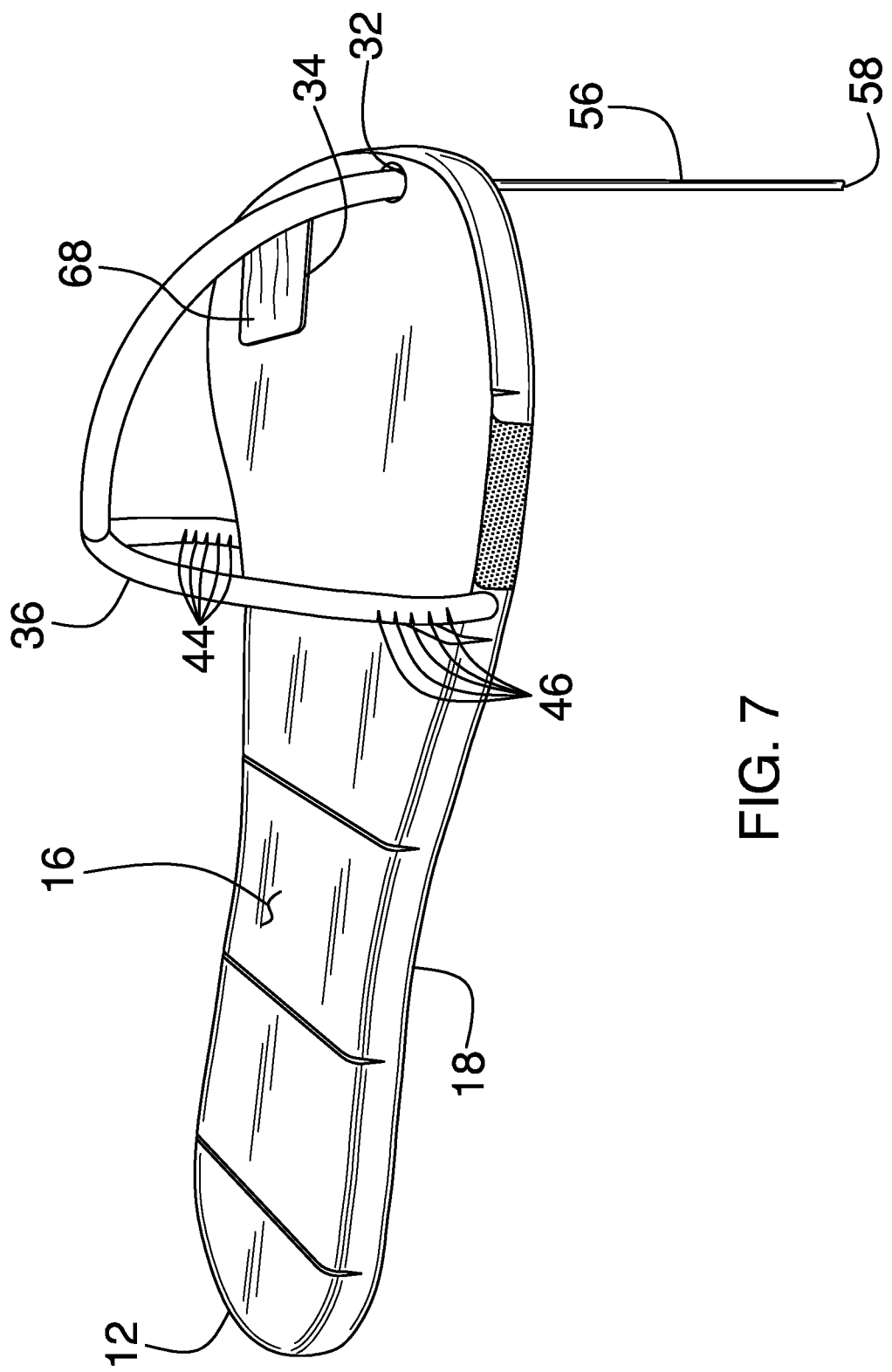
FIG. 7 is a perspective view of an embodiment of the disclosure showing a net being removed from a first tube and a second tube.
Figure 8:
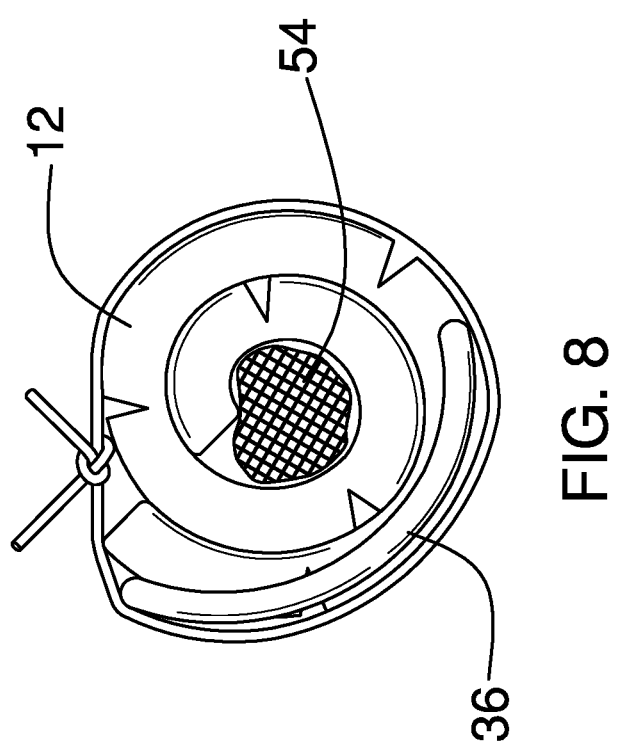
FIG. 8 is a perspective view of an embodiment of the disclosure showing a mat being rolled up into a roll for storage.

With reference now to the drawings, and in particular to FIGS. 1 through 8 thereof, a new mattress device embodying the principles and concepts of an embodiment of the disclosure and generally designated by the reference numeral 10 will be described.

As best illustrated in FIGS. 1 through 8, the floatation mattress assembly 10 generally comprises a mat 12 that is comprised of a resiliently compressible material. In this way the mat 12 can be slept upon for camping, a sleepover or other occasion requiring a temporary sleeping area. Additionally, the mat 12 is comprised of a buoyant material, such as expanded foam or the like, that has a specific gravity of less than 1.0. In this way the mat 12 can float on water 14 thereby facilitating a user to lie on the mat 12 to float in a body of water 14. The mat 12 has a top surface 16, a bottom surface 18 and a perimeter surface 20 extending therebetween. The perimeter surface 20 has a front side 22, a back side 24, a first lateral side 26 and a second lateral side 28. The mat 12 is elongated between the front 22 and back 24 sides, and each of the front 22 and back 24 sides is rounded. Moreover, each of the first 26 and second 28 lateral sides curves outwardly between the back side 24 and the front side 22. Thus, the mat 12 has the ornamental appearance of a flip flop article of footwear.

The top surface 16 has a plurality of grooves 30 each extending toward the bottom surface 18. The grooves 30 are spaced apart from each other and are distributed between the front 22 and back 24 sides of the perimeter surface 20. In this way the grooves 30 facilitate the mat 12 to be rolled up into a roll for storage. The mat 12 has an aperture 32 extending through the top 16 and bottom 18 surfaces, and the aperture 32 is positioned closer to the front side 22 than the rear side. Additionally, the aperture 32 is centrally positioned on the mat 12. The mat 12 has an opening 34 extending through the top 16 and bottom 18 surfaces. The opening 34 is positioned closer to the front side 22 than the back side 24, and the opening 34 is positioned closer to the first lateral side 26 than the second lateral side 28.

A first tube 36 is provided and the first tube 36 is pivotally coupled to the mat 12. The first tube 36 is positionable in a deployed position having the first tube 36 arcing upwardly over the mat 12. The first tube 36 is positionable in a stored position having the first tube 36 lying on the mat 12. The first tube 36 has a first end 38 and a second end 40, and each of the first 38 and second 40 ends is pivotally coupled to a respective one of the first 26 and second 28 lateral sides of the perimeter surface 20 at a connection point 42 on the respective first 26 and second 28 lateral sides. The connection point 42 for each of the first 38 and second 40 ends of the tube is positioned closer to the front side 22 than the back side 24 of the perimeter surface 20.

The first tube 36 has a plurality of first cuts 44 extending partially therein. The first cuts 44 are spaced apart from each other and are distributed from the first end 38 toward the second end 40. The first tube 36 has a plurality of second cuts 46 extending partially therein. The second cuts 46 are spaced apart from each other and are distributed from the second end 40 toward the first end 38. The first tube 36 may be comprised of a resiliently compressible material. Additionally, the first tube 36 may be comprised of a buoyant material similar to the material of which the mat 12 is comprised.

A second tube 48 is provided and the second tube 48 is coupled to the first tube 36 and slidably extends through the mat 12. The second tube 48 curves upwardly between the mat 12 and the first tube 36 when the first tube 36 is positioned in the deployed position. In this way each of the first 36 and second 48 tubes has the ornamental appearance of foot straps on the flip flop article of footwear. The second tube 48 is urgeable downwardly through the mat 12 for urging the first tube 36 into the stored position.

The second tube 48 has a primary end 50 and a secondary end 52, and the primary end 50 is coupled to the first tube 36 at a point that is centrally located between the first 38 and second 40 ends of the first tube 36. The second tube 48 extends through the aperture 32 in the mat 12 having the secondary end 52 being exposed with respect to the bottom surface 18 of the mat 12. The secondary end 52 is aligned with the bottom surface 18 when the first tube 36 is positioned in the deployed position. The secondary end 52 is spaced from the bottom surface 18 of the mat 12 when the first tube 36 is positioned in the stored position. The second tube 48 may be comprised of a resiliently compressible material. Additionally, the second tube 48 may be comprised of a buoyant material similar to the material of which the mat 12 is comprised.

A net 54 is removably attached to each of the first 36 and second 48 tubes. The net 54 forms a hemispherical dome over the mat 12 when the first tube 36 is positioned in the deployed position. A disk 51 is provided that has an upper surface 53 and lower surface 55. The upper surface 53 is coupled to the secondary end 52 of the second tube 48. Thus, the disk 51 inhibits the secondary end 52 from being pulled upwardly through the aperture 32 in the mat 12. A lanyard 56 is coupled to and extends downwardly from the lower surface 55 of the disk 51. The lanyard 56 can be gripped for urging the second tube 48 downwardly through the mat 12. The lanyard 56 has a distal end 58 with respect to the lower surface 55 of the disk 51. An anchor 60 is removably coupled to the lanyard 56 to inhibit movement of the mat 12 when the mat 12 is floating. The anchor 60 has an attachment 62 thereon and the attachment 62 releasably engages the distal end 58 of the lanyard 56.

A container 64 is provided and the container 64 is coupled to and extends downwardly from the mat 12. Thus, the container 64 is submerged in the water 14 when the mat 12 floats on the water 14 thereby facilitating the container 64 to contain food or beverages. The container 64 has a top end 66 and the top end 66 is open. Moreover, the top end 66 is bonded to the bottom surface 18 of the mat 12 having the top end 66 being aligned with the opening 34 in the mat 12 for accessing an interior of the container 64. A cover 68 is movably coupled to the container 64 for opening 34 and closing the container 64. The cover 68 is aligned with the opening 34 on the top surface 16 of the mat 12. Thus, the cover 68 has the ornamental appearance of a toe nail of a wearer of the flip flop article of footwear.

A first mating member 70 is coupled to the first lateral side 26 of the perimeter surface 20 of the mat 12. The first mating member 70 is positioned closer to the front side 22 of the perimeter surface 20 than the back side 24 of the perimeter surface 20. A second mating member 72 is coupled to the second lateral side 28 of the perimeter surface 20 of the mat 12. The second mating member 72 is positioned closer to the front side 22 of the perimeter surface 20 than the back side 24 of the perimeter surface 20. Each of the first 70 and second 72 mating members may comprise a hook and loop fastener or the like. In this way, the first 70 and second 72 mating members can releasably engage respective ones of first 70 or second 72 mating members on a plurality of the mats 12. In this way the plurality of mats 12 can be coupled together when the mats 12 are floating in the water 14.

In use, the mat 12 can be positioned in a support surface, such as ground or the like, thereby facilitating the mat 12 to be slept upon. The mat 12 can also be positioned in a body of water 14, such as a swimming pool or the like, for floating on the body of water 14. In this way a user can lie on the mat 12 for floating on the body of water 14. The first tube 36 can be selectively positioned in either the deployed position or the stored position. Thus, the net 54 can form the dome over the mat 12 when the first tube 36 is positioned in the deployed position. Food and beverages can be positioned in the container 64 when the mat 12 is floating on the body of water 14. Additionally, the anchor 60 can be coupled to the lanyard 56 when the mat 12 is floating on the body of water 14. In this way the anchor 60 inhibits the mat 12 from being blown around by wind or the like. As is most clearly shown in FIG. 8, the mat 12 can be rolled up into a roll for storage, and a rope or the like can be tied around the mat 12 for retaining the mat 12 in the roll.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A floatation mattress assembly being configured to float on water or supply a compressible sleeping surface, said assembly comprising:

a mat being comprised of a resiliently compressible material wherein said mat is configured to be slept upon, said mat being comprised of a buoyant material wherein said mat is configured to float on water thereby facilitating a user to lie on said mat to float on a body of water, said mat having a top surface, a bottom surface and a perimeter surface extending therebetween, said perimeter surface having a front side, a back side, a first lateral side and a second lateral side, said mat being elongated between said front and back sides, each of said front and back sides being rounded, each of said first and second lateral sides curving outwardly between said back side and said front side wherein said mat is configured to have the ornamental appearance of a flip flop article of footwear;

a first tube being pivotally coupled to said mat, said first tube being positionable in a deployed position having said first tube arcing upwardly over said mat, said first tube being positionable in a stored position having said first tube lying on said mat;

a second tube being coupled to said first tube and slidably extending through said mat, said second tube curving upwardly between said mat and said first tube when said first tube is positioned in said deployed position wherein each of said first and second tubes is configured to have the ornamental appearance of foot straps on the flip flop article of footwear, said second tube being urgeable downwardly through said mat for urging said first tube into said stored position; and a net being removably attached to each of said first and second tubes, said net forming a hemispherical dome over said mat when said first tube is positioned in said deployed position.

2. The assembly according to claim 1, wherein:

said top surface of said mat has a plurality of grooves each extending toward said bottom surface, said grooves being spaced apart from each other and being distributed between said front and back sides of said perimeter surface thereby facilitating said mat to be rolled up into a roll for storage;

said mat has an aperture extending through said top and bottom surfaces, said aperture being positioned closer to said front side than said rear side, said aperture being centrally positioned on said mat; and said mat has an opening extending through said top and bottom surfaces, said opening being positioned closer to said front side than said back side, said opening being positioned closer to said first lateral side than said second lateral side.

3. The assembly according to claim 2, wherein said first tube has a first end and a second end, each of said first and second ends being pivotally coupled to a respective one of said first and second lateral sides of said perimeter surface at a connection point on said respective first and second lateral sides, said connection point for each of said first and second ends of said tube being positioned closer to said front side than said back side of said perimeter surface.

4. The assembly according to claim 3, wherein:

said first tube has a plurality of first cuts extending partially therein, said first cuts being spaced apart from each other and being distributed from said first end toward said second end; and said first tube has a plurality of second cuts extending partially therein, said second cuts being spaced apart from each other and being distributed from said second end toward said first end.

5. The assembly according to claim 3, wherein said second tube having a primary end and a secondary end, said primary end being coupled to said first tube at a point being centrally located between said first and second ends of said first tube, said second tube extending through said aperture in said mat having said secondary end being exposed with respect to said bottom surface of said mat, said secondary end being aligned with said bottom surface when said first tube is positioned in said deployed position, said secondary end being spaced from said bottom surface of said mat when said first tube is positioned in said stored position.

6. The assembly according to claim 5, further comprising a lanyard being coupled to and extending downwardly from said second tube wherein said lanyard is configured to be gripped for urging said second tube downwardly through said mat, said lanyard having a distal end with respect to said secondary end of said second tube.

7. The assembly according to claim 6, further comprising an anchor being removably coupled to said lanyard wherein said anchor is configured to inhibit movement of said mat when said mat is floating, said anchor having an attachment thereon, said attachment releasably engaging said distal end of said lanyard.

8. The assembly according to claim 2, further comprising a container being coupled to and extending downwardly from said mat wherein said container is configured to be submerged in the water when said mat floats on the water thereby facilitating said container to contain food or beverages, said container having a top end, said top end being open, said top end being bonded to said bottom surface of said mat having said top end being aligned with said opening in said mat for accessing an interior of said container.

9. The assembly according to claim 8, further comprising a cover being movably coupled to said container for opening and closing said container, said cover being aligned with said opening on said top surface of said mat wherein said cover is configured to have the ornamental appearance of a toe nail of a wearer of the flip flop article of footwear.

10. The assembly according to claim 2, further comprising a first mating member being coupled to said first lateral side of said perimeter surface of said mat, said first mating member being positioned closer to said front side of said perimeter surface than said back side of said perimeter surface.

11. The assembly according to claim 10, further comprising a second mating member being coupled to said second lateral side of said perimeter surface of said mat, said second mating member being positioned closer to said front side of said perimeter surface than said back side of said perimeter surface.

12. A floatation mattress assembly being configured to float on water or supply a compressible sleeping surface, said assembly comprising:

a mat being comprised of a resiliently compressible material wherein said mat is configured to be slept upon, said mat being comprised of a buoyant material wherein said mat is configured to float on water thereby facilitating a user to lie on said mat to float on a body of water, said mat having a top surface, a bottom surface and a perimeter surface extending therebetween, said perimeter surface having a front side, a back side, a first lateral side and a second lateral side, said mat being elongated between said front and back sides, each of said front and back sides being rounded, each of said first and second lateral sides curving outwardly between said back side and said front side wherein said mat is configured to have the ornamental appearance of a flip flop article of footwear, said top surface having a plurality of grooves each extending toward said bottom surface, said grooves being spaced apart from each other and being distributed between said front and back sides of said perimeter surface thereby facilitating said mat to be rolled up into a roll for storage, said mat having an aperture extending through said top and bottom surfaces, said aperture being positioned closer to said front side than said rear side, said aperture being centrally positioned on said mat, said mat having an opening extending through said top and bottom surfaces, said opening being positioned closer to said front side than said back side, said opening being positioned closer to said first lateral side than said second lateral side;

a first tube being pivotally coupled to said mat, said first tube being positionable in a deployed position having said first tube arcing upwardly over said mat, said first tube being positionable in a stored position having said first tube lying on said mat, said first tube having a first end and a second end, each of said first and second ends being pivotally coupled to a respective one of said first and second lateral sides of said perimeter surface at a connection point on said respective first and second lateral sides, said connection point for each of said first and second ends of said tube being positioned closer to said front side than said back side of said perimeter surface, said first tube having a plurality of first cuts extending partially therein, said first cuts being spaced apart from each other and being distributed from said first end toward said second end, said first tube having a plurality of second cuts extending partially therein, said second cuts being spaced apart from each other and being distributed from said second end toward said first end;

a second tube being coupled to said first tube and slidably extending through said mat, said second tube curving upwardly between said mat and said first tube when said first tube is positioned in said deployed position wherein each of said first and second tubes is configured to have the ornamental appearance of foot straps on the flip flop article of footwear, said second tube being urgeable downwardly through said mat for urging said first tube into said stored position, said second tube having a primary end and a secondary end, said primary end being coupled to said first tube at a point being centrally located between said first and second ends of said first tube, said second tube extending through said aperture in said mat having said secondary end being exposed with respect to said bottom surface of said mat, said secondary end being aligned with said bottom surface when said first tube is positioned in said deployed position, said secondary end being spaced from said bottom surface of said mat when said first tube is positioned in said stored position;

a net being removably attached to each of said first and second tubes, said net forming a hemispherical dome over said mat when said first tube is positioned in said deployed position;

a lanyard being coupled to and extending downwardly from said second tube wherein said lanyard is configured to be gripped for urging said second tube downwardly through said mat, said lanyard having a distal end with respect to said secondary end of said second tube;

an anchor being removably coupled to said lanyard wherein said anchor is configured to inhibit movement of said mat when said mat is floating, said anchor having an attachment thereon, said attachment releasably engaging said distal end of said lanyard;

a container being coupled to and extending downwardly from said mat wherein said container is configured to be submerged in the water when said mat floats on the water thereby facilitating said container to contain food or beverages, said container having a top end, said top end being open, said top end being bonded to said bottom surface of said mat having said top end being aligned with said opening in said mat for accessing an interior of said container;

a cover being movably coupled to said container for opening and closing said container, said cover being aligned with said opening on said top surface of said mat wherein said cover is configured to have the ornamental appearance of a toe nail of a wearer of the flip flop article of footwear;

a first mating member being coupled to said first lateral side of said perimeter surface of said mat, said first mating member being positioned closer to said front side of said perimeter surface than said back side of said perimeter surface; and a second mating member being coupled to said second lateral side of said perimeter surface of said mat, said second mating member being positioned closer to said front side of said perimeter surface than said back side of said perimeter surface.

* * * * *